US008315606B2

(12) United States Patent
Gisby et al.

(10) Patent No.: US 8,315,606 B2
(45) Date of Patent: Nov. 20, 2012

(54) SYSTEM AND METHOD FOR INTELLIGENT CALL IDENTIFICATION ON A MOBILE COMMUNICATION DEVICE

(75) Inventors: Douglas Gisby, Redwood City, CA (US); Michael Gray, Montclair, NJ (US); Colin Werner, Kitchener (CA); Carsten Bergmann, San Jose, CA (US)

(73) Assignees: Research In Motion Limited, Waterloo, Ontario (CA); Ascendent Telecommunications, Inc., Redwood City, CA (US)

( * ) Notice: Subject to any disclaimer, the term of this patent is extended or adjusted under 35 U.S.C. 154(b) by 274 days.

(21) Appl. No.: 12/394,808

(22) Filed: Feb. 27, 2009

(65) Prior Publication Data
US 2010/0222028 A1  Sep. 2, 2010

(51) Int. Cl.
*H04M 1/725* (2006.01)
(52) U.S. Cl. .................. 455/412.2; 379/93.03; 455/415
(58) Field of Classification Search ............... 379/93.03, 379/93.18; 455/412.2, 415
See application file for complete search history.

(56) References Cited

U.S. PATENT DOCUMENTS

| 6,041,103 | A  | * | 3/2000 | La Porta et al. | 379/67.1 |
| 6,477,365 | B2 | * | 11/2002 | Fukuda | 455/415 |
| 6,542,586 | B1 | * | 4/2003 | Helstab | 379/93.19 |
| 6,665,534 | B1 |   | 12/2003 | Conklin et al. | |
| 6,937,880 | B2 |   | 8/2005 | Teranishi | |
| 6,977,993 | B2 | * | 12/2005 | Starbuck et al. | 379/88.21 |
| 7,123,904 | B2 | * | 10/2006 | Jang | 455/415 |
| 7,277,697 | B2 | * | 10/2007 | Desai et al. | 455/416 |
| 7,860,489 | B2 | * | 12/2010 | Kuhl et al. | 455/415 |
| 2007/0072593 | A1 | * | 3/2007 | Huliyapur Math | 455/415 |

FOREIGN PATENT DOCUMENTS

| GB | 2422984 A | 8/2006 |
| WO | 2008106431 A2 | 9/2008 |

OTHER PUBLICATIONS

European Patent Office, Extended European Search Report dated Aug. 27, 2009, issued in respect of European Patent Application 09154463.5.
Matias Erny Reichl Hoffmann, Response to Extended European Search Report dated Oct. 30, 2009, filed in respect of European Patent Application 09154463.5.
Canadian Intellectual Property Office, Examiner's Requisition dated May 7, 2012, issued in respect of Canadian Patent Application No. 2,694,985.

* cited by examiner

*Primary Examiner* — Vladimir Magloire
*Assistant Examiner* — Michael S Bush
(74) *Attorney, Agent, or Firm* — Norton Rose Canada LLP

(57) ABSTRACT

A mobile device and a method of displaying information regarding an incoming communication to a user of a mobile device are provided. The mobile device receives the incoming information and associated information from, for example, an enterprise network. The communication type of the incoming communication is determined using the associated information and information relating to the communication type is displayed on a display of the mobile device.

21 Claims, 10 Drawing Sheets

SYSTEM AND METHOD FOR INTELLIGENT CALL IDENTIFICATION ON A MOBILE COMMUNICATION DEVICE

FIELD

The present application relates generally to mobile communication devices, and more particularly to systems and methods for identifying the communication type of an incoming communication on a mobile communication device.

BACKGROUND

Many mobile devices are capable of retrieving and displaying identifying information about an incoming communication to the user of the mobile device. This identifying information may aid the user in determining whether to accept a communication at that time. However, the information provided by the mobile device in response to an incoming communication is generally very limited. For example, many mobile devices only provide the number and possibly a name associated with the originator of an incoming telephone call, if it is available. Such information may not be sufficient information for a user to determine whether or not to accept the incoming communication at that time. This is particularly true where, for example, there is a communication already in progress on the mobile device. For example, the user may recognize the name and/or number associated with an incoming communication but lack information about the urgency of the communication and, particularly, the urgency of the communication as compared to the ongoing communication. In other situations, the user of the mobile device may not recognize the name and/or number of the incoming communication and, thus, will have no useful information at all on which to base the decision to accept the communication.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

In one aspect, the present application provides a mobile device adapted for communication with an enterprise telecommunications network. The mobile device comprises: a processor for controlling operations of the mobile device and communications between the mobile device and other devices; a memory coupled to the processor; a communication subsystem adapted for receiving communications and associated information from the enterprise telecommunications network; at least one display for displaying information of the mobile device; a communication identifying module resident in the memory for execution by the processor, the communication identifying module being configured to cause the processor to determine a communication type for an incoming communication received by the communication subsystem, based on the associated information; and a display module for displaying information relating to the communication type on the at least one display. The communication type comprises at least one of two or more possible communication types and the two or more possible communication types comprise at least one feature-based communication type.

In another aspect, the present application provides a method of displaying information regarding an incoming communication on a mobile communications device, the method executed by at least one processor on the mobile communications device, the mobile communications device comprising a communications subsystem and at least one display. The method comprises: receiving, from the communication subsystem, data representing signals representing information about an incoming communication; causing execution of a communication identifying module resident in a memory associated with the processor to determine a communication type of two or more possible communication types and the two or more possible communication types comprising at least one feature-based communication type; and causing the at least one display to display information relating to the communication type.

Other aspects of the present application will be apparent to those of ordinary skill in the art from a review of the following detailed description in conjunction with the drawings.

Embodiments of the present application are not limited to any particular operating system, mobile device architecture, server architecture, or computer programming language.

The present application relates to the control and management of communications. Although reference may be made to "calls" in the description of example embodiments below, it will be appreciated that the described systems and methods are applicable to session-based communications in general and not limited to voice calls. It will also be appreciated that the systems and methods may not be limited to sessions and may be applicable to messaging-based communications in some embodiments.

Figure 1:
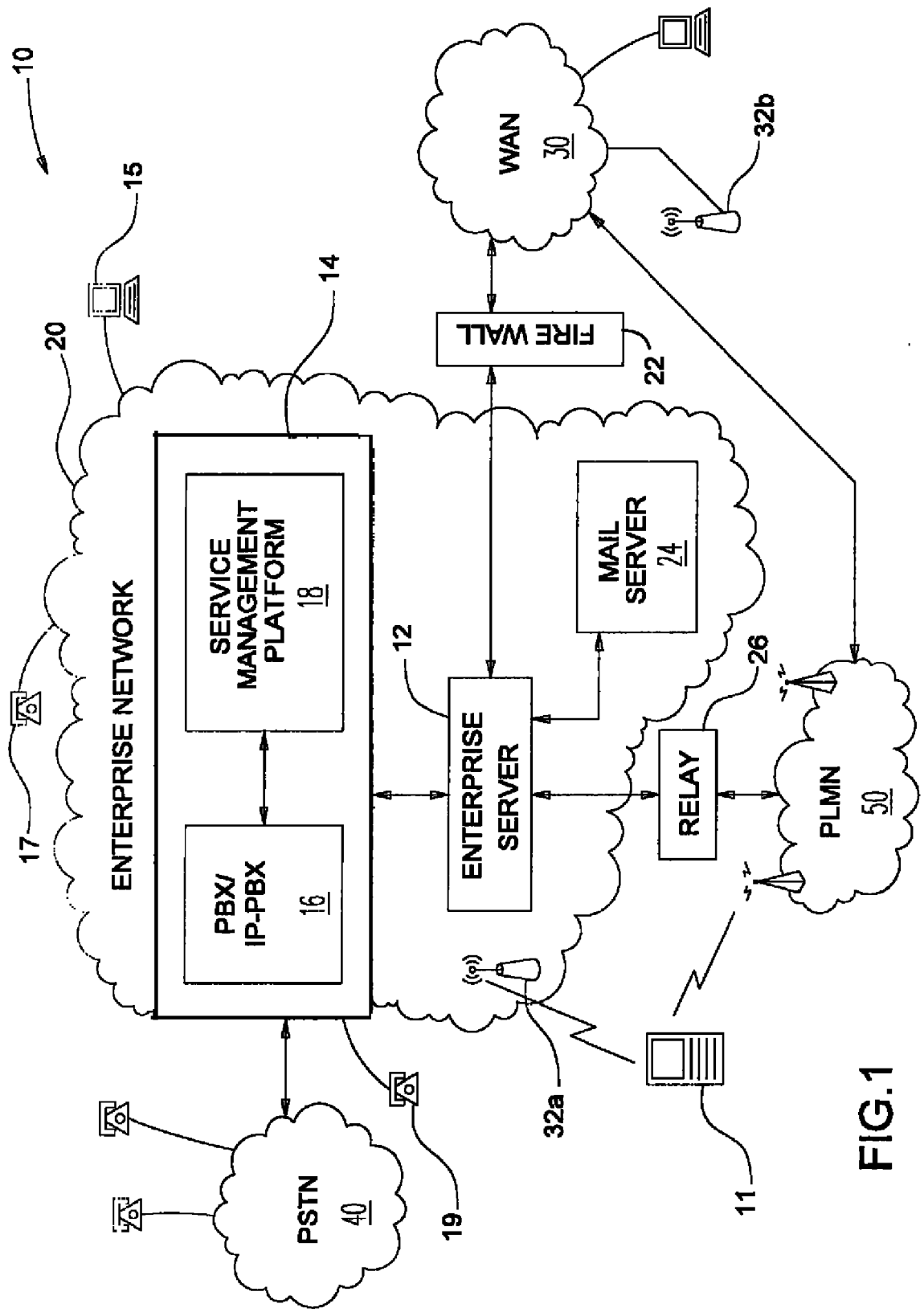
FIG. 1 shows, in block diagram form, an example system for managing enterprise-related mobile calls, including an enterprise communications platform.

Reference is now made to FIG. 1, which shows, in block diagram form, an example system, generally designated 10, for the control and management of communications. The system 10 includes an enterprise or business system 20, which in many embodiments includes a local area network (LAN). In the description below, the enterprise or business system 20 may be referred to as an enterprise network 20. It will be appreciated that the enterprise network 20 may include more than one network and may be located in multiple geographic areas in some embodiments.

The enterprise network 20 may be connected, often through a firewall 22, to a wide area network (WAN) 30, such as the Internet. The enterprise network 20 may also be connected to a public switched telephone network (PSTN) 40 via direct inward dialing (DID) trunks or primary rate interface (PRI) trunks.

The enterprise network 20 may also communicate with a public land mobile network (PLMN) 50, which may also be referred to as a wireless wide area network (WWAN) or, in some cases, a cellular network. The connection with the PLMN 50 may be made via a relay 26, as known in the art.

The enterprise network 20 may also provide a wireless local area network (WLAN) 32a featuring wireless access points. Other WLANs 32 may exist outside the enterprise network 20. For example, WLAN 32b may be connected to WAN 30.

The system 10 may include a number of enterprise-associated mobile devices 11 (only one shown). The mobile devices 11 may include devices equipped for cellular communication through the PLMN 50, mobile devices equipped for Wi-Fi communications over one of the WLANs 32, or dual-mode devices capable of both cellular and WLAN communications. WLANs 32 may be configured in accordance with one of the IEEE 802.11 specifications.

It will be understood that the mobile devices 11 include one or more radio transceivers and associated processing hardware and software to enable wireless communications with the PLMN 50 and/or one of the WLANs 32. In various embodiments, the PLMN 50 and mobile devices 11 may be configured to operate in compliance with any one or more of a number of wireless protocols, including GSM, GPRS, CDMA, EDGE, UMTS, EvDO, HSPA, 3GPP, or a variety of others. It will be appreciated that the mobile device 11 may roam within the PLMN 50 and across PLMNs, in known manner, as the user moves. In some instances, the dual-mode mobile devices 11 and/or the enterprise network 20 are configured to facilitate roaming between the PLMN 50 and a WLAN 32, and are thus capable of seamlessly transferring sessions (such as voice calls) from a connection with the cellular interface of the dual-mode device 11 to the WLAN 32 interface of the dual-mode device 11, and vice versa.

The enterprise network 20 typically includes a number of networked servers, computers, and other devices. For example, the enterprise network 20 may connect one or more desktop or laptop computers 15 (one shown). The connection may be wired or wireless in some embodiments. The enterprise network 20 may also connect to one or more digital telephone sets 17 (one shown).

The enterprise network 20 may include one or more mail servers, such as mail server 24, for coordinating the transmission, storage, and receipt of electronic messages for client devices operating within the enterprise network 20. Typical mail servers include the Microsoft Exchange Server™ and the IBM Lotus Domino™ server. Each user within the enterprise typically has at least one user account within the enterprise network 20. Associated with each user account is message address information, such as an e-mail address. Messages addressed to a user message address are stored on the enterprise network 20 in the mail server 24. The messages may be retrieved by the user using a messaging application, such as an e-mail client application. The messaging application may be operating on a user's computer 15 connected to the enterprise network 20 within the enterprise. In some embodiments, the user may be permitted to access stored messages using a remote computer, for example at another location via the WAN 30 using a VPN connection. Using the messaging application, the user may also compose and send messages addressed to others, within or outside the enterprise network 20. The messaging application causes the mail server 24 to send a composed message to the addressee, often via the WAN 30.

The relay 26 serves to route messages received over the PLMN 50 from the mobile device 11 to the corresponding enterprise network 20. The relay 26 also pushes messages from the enterprise network 20 to the mobile device 11 via the PLMN 50.

The enterprise network 20 also includes an enterprise server 12. Together with the relay 26, the enterprise server 12 functions to redirect or relay incoming e-mail messages addressed to a user's e-mail address within the enterprise network 20 to the user's mobile device 11 and to relay incoming e-mail messages composed and sent via the mobile device 11 out to the intended recipients within the WAN 30 or elsewhere. The enterprise server 12 and relay 26 together facilitate "push" e-mail service for the mobile device 11 enabling the user to send and receive e-mail messages using the mobile device 11 as though the user were connected to an e-mail client within the enterprise network 20 using the user's enterprise-related e-mail address, for example on computer 15.

As is typical in many enterprises, the enterprise network 20 includes a Private Branch eXchange (although in various embodiments the PBX may be a standard PBX or an IP-PBX, for simplicity the description below uses the term PBX to refer to both) 16 having a connection with the PSTN 40 for routing incoming and outgoing voice calls for the enterprise. The PBX 16 is connected to the PSTN 40 via DID trunks or PRI trunks, for example. The PBX 16 may use ISDN signaling protocols for setting up and tearing down circuit-switched connections through the PSTN 40 and related signaling and communications. In some embodiments, the PBX 16 may be connected to one or more conventional analog telephones 19. The PBX 16 is also connected to the enterprise network 20 and, through it, to telephone terminal devices, such as digital telephone sets 17, softphones operating on computers 15, etc. Within the enterprise, each individual may have an associated extension number, sometimes referred to as a PNP (private numbering plan), or direct dial phone number. Calls outgoing from the PBX 16 to the PSTN 40 or incoming from the PSTN 40 to the PBX 16 are typically circuit-switched calls. Within the enterprise, e.g. between the PBX 16 and terminal devices, voice calls are often packet-switched calls, for example Voice-over-IP (VoIP) calls.

The enterprise network 20 may further include a Service Management Platform (SMP) 18 for performing some aspects of messaging or session control, like call control and advanced call processing features. The SMP 18 may, in some cases, also perform some media handling. Collectively the SMP 18 and PBX 16 may be referred to as the enterprise communications platform, generally designated 14. It will be appreciated that the enterprise communications platform 14 and, in particular, the SMP 18, is implemented on one or more servers having suitable communications interfaces for connecting to and communicating with the PBX 16 and/or DID/PRI trunks. Although the SMP 18 may be implemented on a stand-alone server, it will be appreciated that it may be implemented into an existing control agent/server as a logical software component. As will be described below, the SMP 18 may be implemented as a multi-layer platform.

The enterprise communications platform 14 implements the switching to connect session legs and may provide the conversion between, for example, a circuit-switched call and a VoIP call, or to connect legs of other media sessions. In some embodiments, in the context of voice calls the enterprise communications platform 14 provides a number of additional functions including automated attendant, interactive voice response, call forwarding, voice mail, etc. It may also implement certain usage restrictions on enterprise users, such as blocking international calls or 1-900 calls. In many embodiments, Session Initiation Protocol (SIP) may be used to set-up, manage, and terminate media sessions for voice calls. Other protocols may also be employed by the enterprise communications platform 14, for example, Web Services, Computer Telephony Integration (CTI) protocol, Session Initiation Protocol for Instant Messaging and Presence Leveraging Extensions (SIMPLE), and various custom Application Programming Interfaces (APIs), as will be described in greater detail below.

One of the functions of the enterprise communications platform 14 is to extend the features of enterprise telephony to the mobile devices 11. For example, the enterprise communications platform 14 may allow the mobile device 11 to perform functions akin to those normally available on a standard office telephone, such as the digital telephone set 17 or analog telephone set 15. Example features may include direct extension dialing, enterprise voice mail, conferencing, call transfer, call park, etc.

Figure 2:
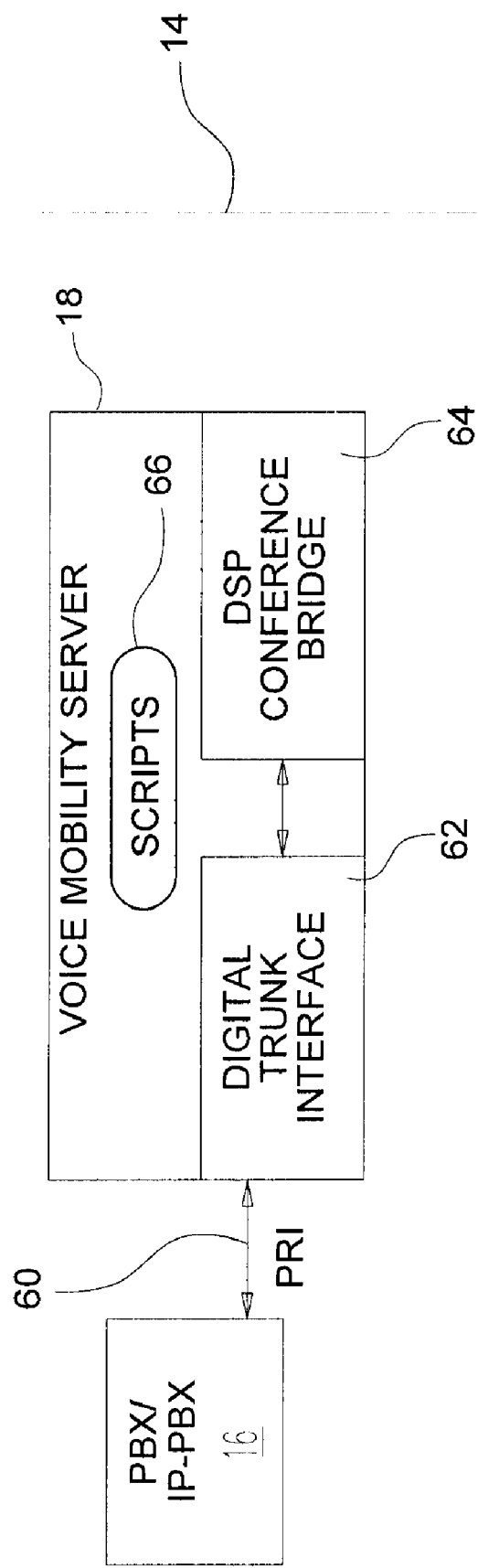
FIG. 2 shows, in block diagram form, further details of an embodiment of the enterprise communications platform.
Figure 3:
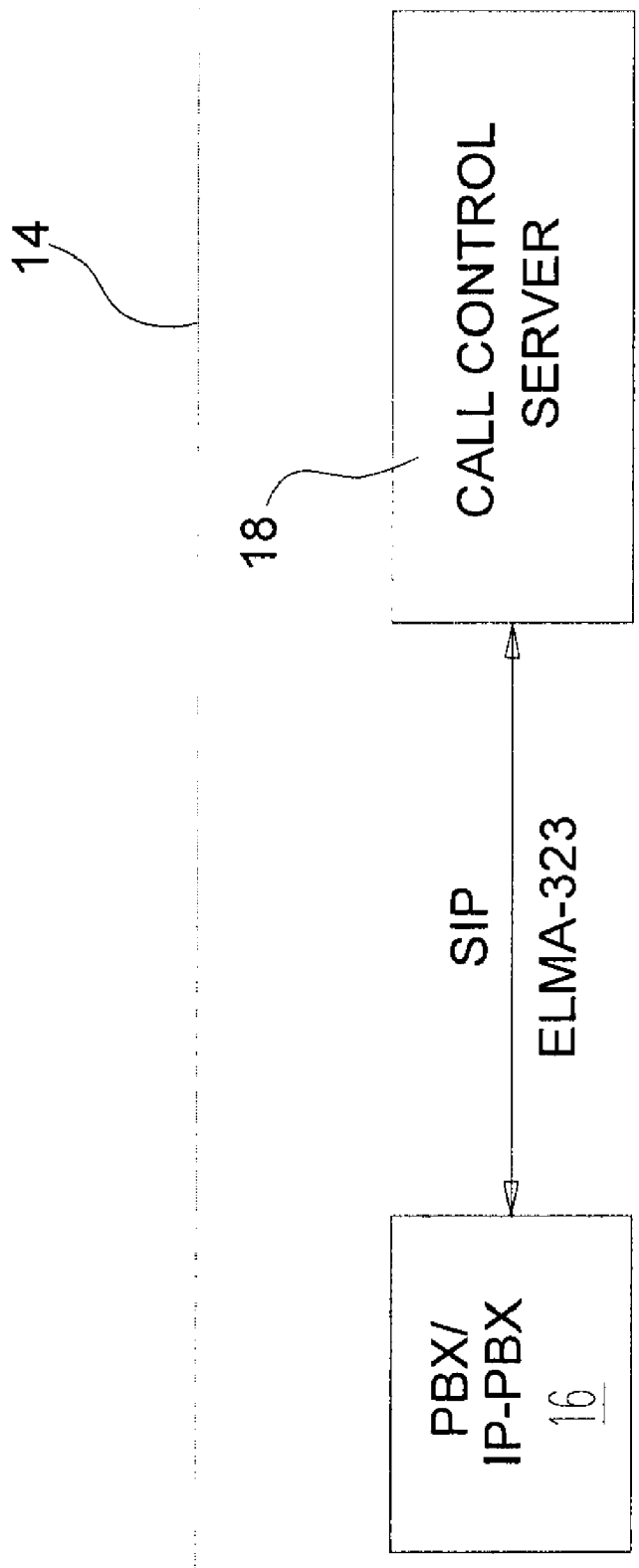
FIG. 3 shows another embodiment of the enterprise communications platform.
Figure 4:
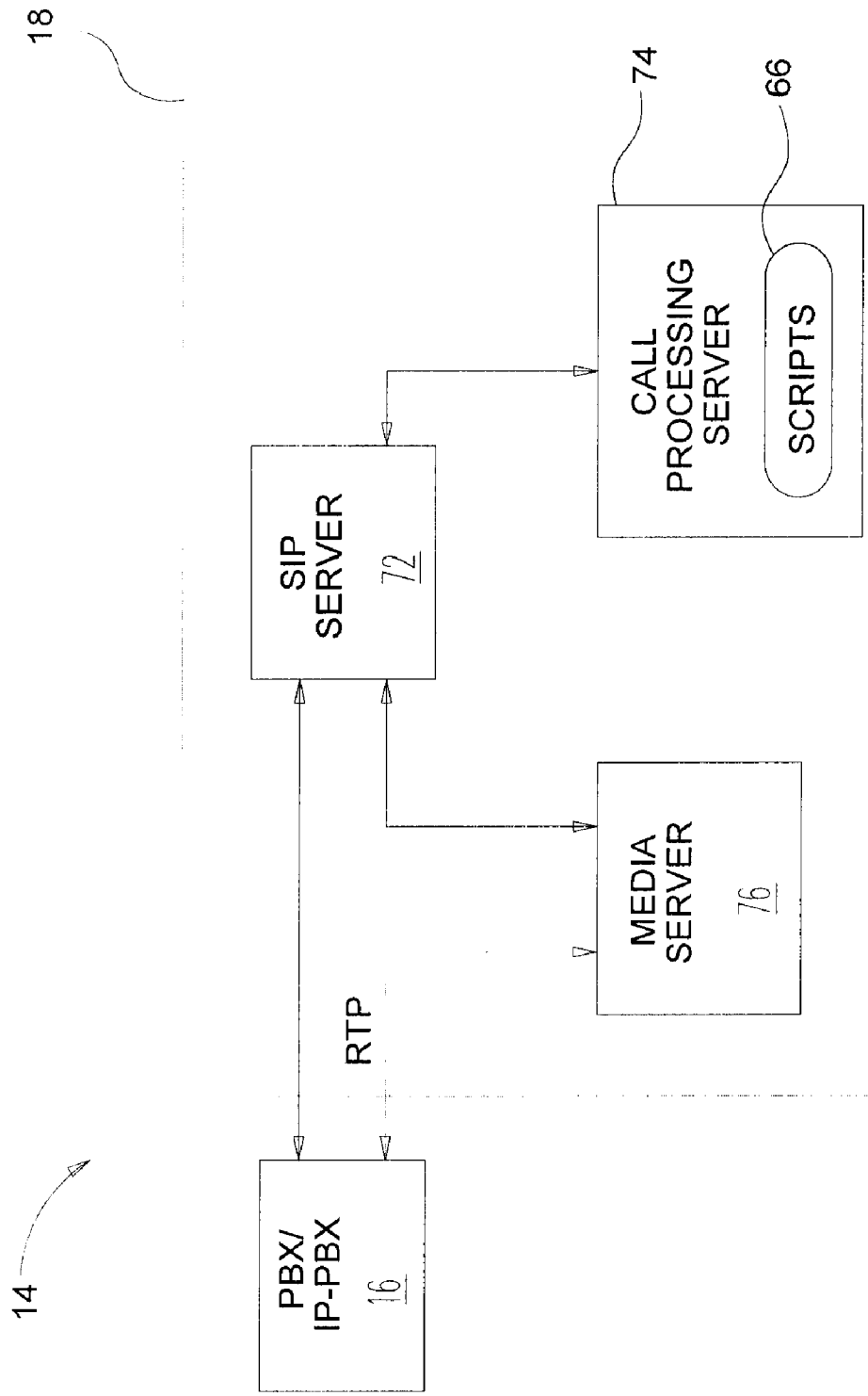
FIG. 4 shows yet another embodiment of the enterprise communications platform.

Reference is now made to FIGS. 2 to 4, which show example embodiments of the enterprise communications system 14. Again, although references are made below to "calls" or call-centric features, it will be appreciated that the architectures and systems depicted and described are applicable to session-based communications in general and, in some instances, to messaging-based communications.

FIG. 2 illustrates an embodiment intended for use in a circuit-switched TDM context. The PBX 16 is coupled to the SMP 18 via PRI connection 60 or other suitable digital trunk. In some embodiments, the PRI connection 60 may include a first PRI connection, a second PRI connection, and a channel service unit (CSU), wherein the CSU is a mechanism for connecting computing devices to digital mediums in a manner that allows for the retiming and regeneration of incoming signals. It will be appreciated that there may be additional or alternative connections between the PBX 16 and the SMP 18.

In this embodiment, the SMP 18 assumes control over both call processing and the media itself. This architecture may be referred to as "First Party Call Control". Many of the media handling functions normally implemented by the PBX 16 are handled by the SMP 18 in this architecture. Incoming calls addressed to any extension or direct dial number within the enterprise, for example, are always first routed to the SMP 18. Thereafter, a call leg is established from the SMP 18 to the called party within the enterprise, and the two legs are bridged. Accordingly, the SMP 18 includes a digital trunk interface 62 and a digital signal processing (DSP) conferencing bridge 64. The DSP conferencing bridge 64 performs the bridging of calls for implementation of various call features, such as conferencing, call transfer, etc. The digital trunk interface 62 may be implemented as a plurality of telephonic cards, e.g. Intel Dialogic cards, interconnected by a bus and operating under the control of a processor. The digital trunk interface 62 may also be partly implemented using a processor module such as, for example, a Host Media Processing (HMP) processor.

The SMP 18 may include various scripts 66 for managing call processing. The scripts 66 are implemented as software modules, routines, functions, etc., stored in non-volatile memory and executed by the processor of the SMP 18. The scripts 66 may implement call flow logic, business logic, user preferences, call service processes, and various feature applications.

FIG. 3 shows another embodiment of enterprise communications platform 14, in which the PBX 16 performs the functions of terminating and/or bridging media streams, but call control functions are largely handled by the SMP 18. In this embodiment, the SMP 18 may be referred to as a call control server 18. This architecture may be referred to as "Third-Party Call Control".

The call control server 18 is coupled to the PBX 16, for example through the LAN, enabling packet-based communications and, more specifically, IP-based communications. In one embodiment, communications between the PBX 16 and the call control server 18 are carried out in accordance with SIP. In other words, the call control server 18 uses SIP-based communications to manage the set up, tear down, and control of media handled by the PBX 16. In one example embodiment, the call control server 18 may employ a communications protocol conforming to the ECMA-269 or ECMA-323 standards for Computer Supported Telecommunications Applications (CSTA).

FIG. 4 shows yet another embodiment of the enterprise communications system 14. This embodiment reflects the adaptation of an existing set of call processing scripts to an architecture that relies on third-party call control, with separate call control and media handling. The SMP 18 includes a call processing server 74. The call processing server 74 includes the scripts or other programming constructs for performing call handling functions. The SMP 18 also includes a SIP server 72 and a media server 76. The separate SIP server 72 and media server 76 logically separate the call control from media handling. The SIP server 72 interacts with the call processing server 74 using a computer-implemented communications handling protocol, such as one of the ECMA-269 or ECMA-323 standards. These standards prescribe XML based messaging for implementing Computer Supported Telecommunications Applications (CSTA).

The SIP server 72 interacts with the media server 76 using SIP-based media handling commands. For example, the SIP server 72 and media server 76 may communicate using Media Server Markup Language (MSML) as defined in IETF document Saleem A., "Media Server Markup Language", Internet Draft, draft-saleem-msml-07, Aug. 7, 2008. The media server 76 may be configured to perform Host Media Processing (HMP).

Other architectures or configurations for the enterprise communications system 14 will be appreciated by those ordinarily skilled in the art.

Figure 5A:
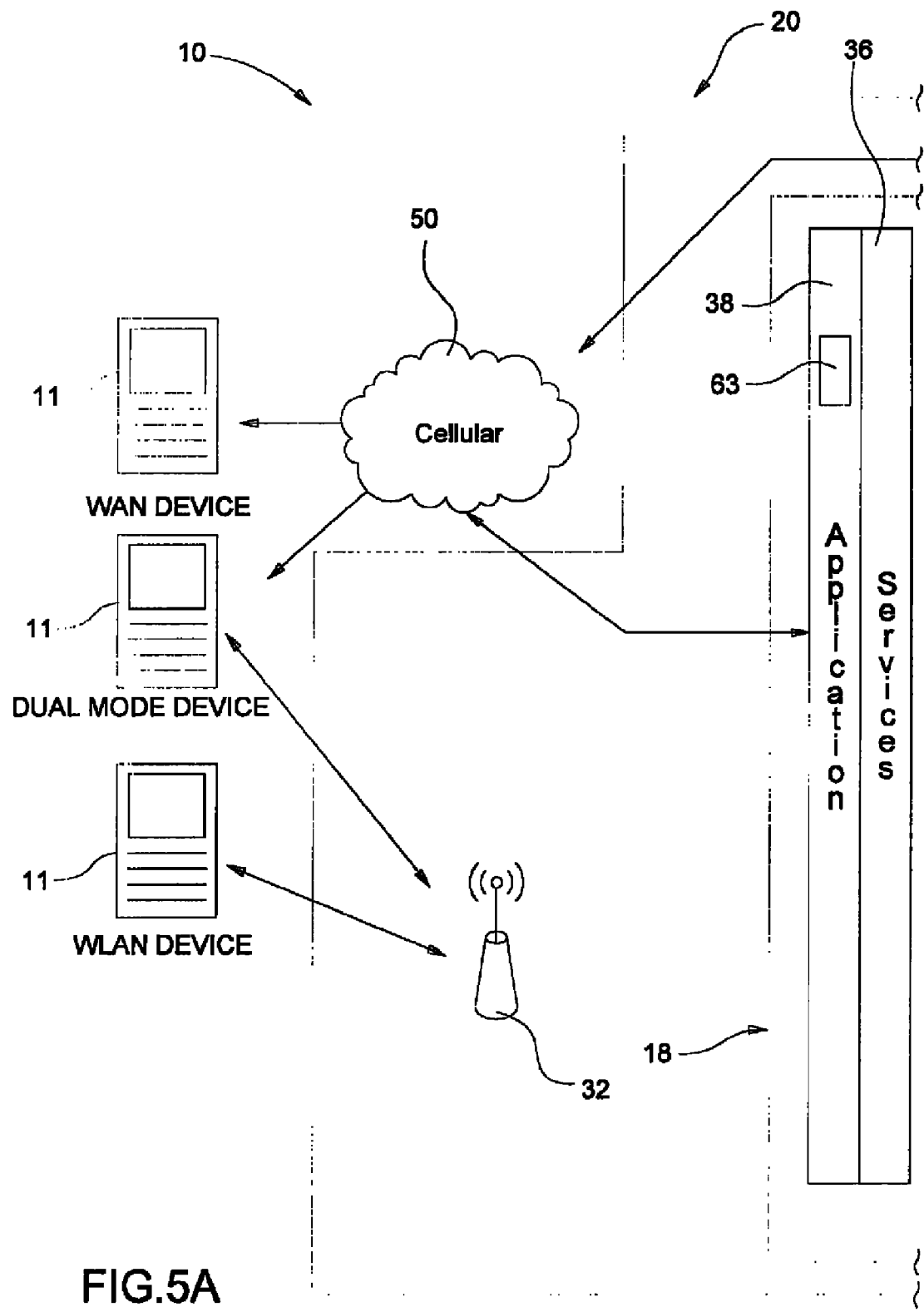
FIGS. 5A and 5B show, in block diagram form, further details of the enterprise communications platform of FIG. 3.
Figure 5B:
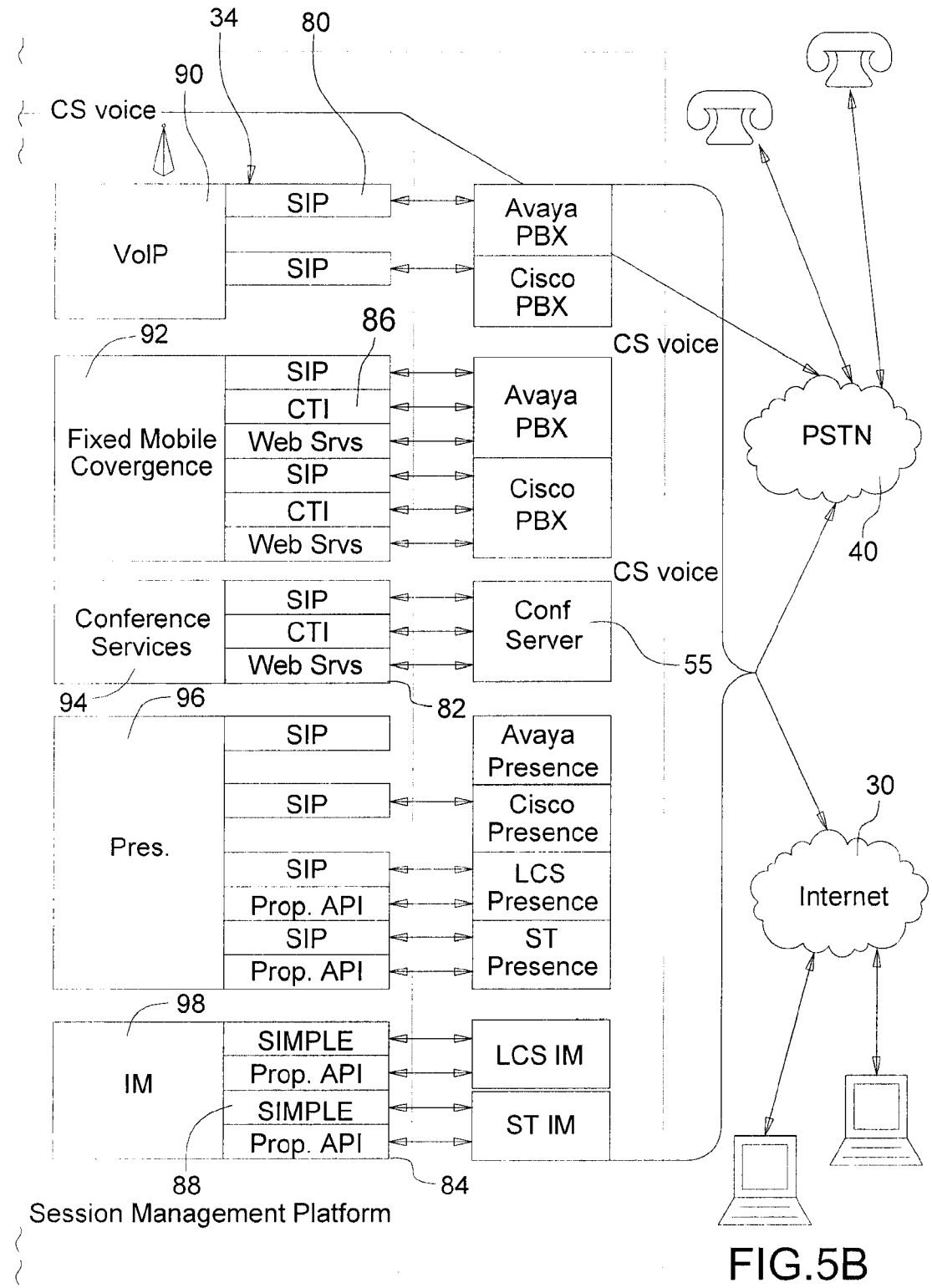

Reference is now made to FIGS. 5A and 5B, collectively referred to as FIG. 5, which shows another embodiment of the enterprise communications system 14 with a Third Party Call Control architecture. In this embodiment, the SMP 18 is a multi-layer platform that includes a protocol layer 34, a services layer 36 and an application layer 38. The protocol layer 34 includes a plurality of interface protocols configured for enabling operation of corresponding applications in the application layer 38. The services layer 36 includes a plurality of services that can be leveraged by the interface protocols to create richer applications. Finally, the application layer 38 includes a plurality of applications that are exposed out to the communication devices and that leverage corresponding ones of the services and interface protocols for enabling the applications.

Specifically, the protocol layer 34 preferably includes protocols which allow media to be controlled separate from data. For example, the protocol layer 34 can include, among other things, a Session Initiation Protocol or SIP 80, a Web Services protocol 82, an Application Programming Interface or API 84, a Computer Telephony Integration protocol or CTI 86, and a Session Initiation Protocol for Instant Messaging and Presence Leveraging Extensions or SIMPLE protocol 88. It is contemplated that the interface protocols 80-88 are plug-ins that can interface directly with corresponding servers in the enterprise network 20, which will be further described below.

For the purposes of this disclosure, SIP 80 will be utilized, although it is appreciated that the system 10 can operate using the above disclosed or additional protocols. As known by those of ordinary skill in the art, SIP is the IETF (Internet Engineering Task Force) standard for multimedia session management, and more specifically is an application-layer control protocol for establishing, maintaining, modifying and terminating multimedia sessions between two or more endpoints. As further known by those of ordinary skill in the art, the SIP protocol 80 includes two interfaces for signaling: SIP-Trunk (hereinafter referred to as "SIP-T") and SIP-Line (hereinafter referred to as "SIP-L"). Specifically, the SIP-T interface is utilized when the endpoint is a non-specific entity or not registered (i.e., when communicating between two network entities). In contrast, the SIP-L interface is utilized when the endpoint is registered (i.e., when dialing to a specific extension). The specific operation of the system 10 utilizing SIP 80 will be described in further detail below.

The SMP 18 also includes a plurality of enablers, among other things, a VoIP enabler 90, a Fixed Mobile Convergence or FMC enabler 92, a conference services enabler 94, a presence enabler 96 and an Instant Messaging or IM enabler 98. Each of the enablers 90-98 are used by corresponding services in the services layer 36 that combine one or more of the enablers. Each of the applications in the application layer 38 is then combined with one or more of the services to perform the desired application. For example, a phone call service may use the VoIP or PBX enabler, and an emergency response application may use the phone call service, an Instant Messenger service, a video call service, and email service and/or a conference service.

The application layer 38 may include a conference services application 63 that, together with the conference services enabler 94, enables multiple communication devices (including desk telephones and personal computers) to participate in a conference call through use of a centralized conference server 55. As seen in FIG. 5, the conference server 55 is provided in the enterprise network 20 and is in communication with the conference services enabler 94 preferably through the SIP protocol 80, although it is recognized that additional protocols that control media separate from data may be appropriate, such as the Web Services protocol 82 or the CTI protocol 86. As will be described in further detail below, the conference call server 55 is configured for directing media and data streams to and from one or more communication devices (i.e., mobile devices 11, telephones 17, and computers 15).

Figure 6:
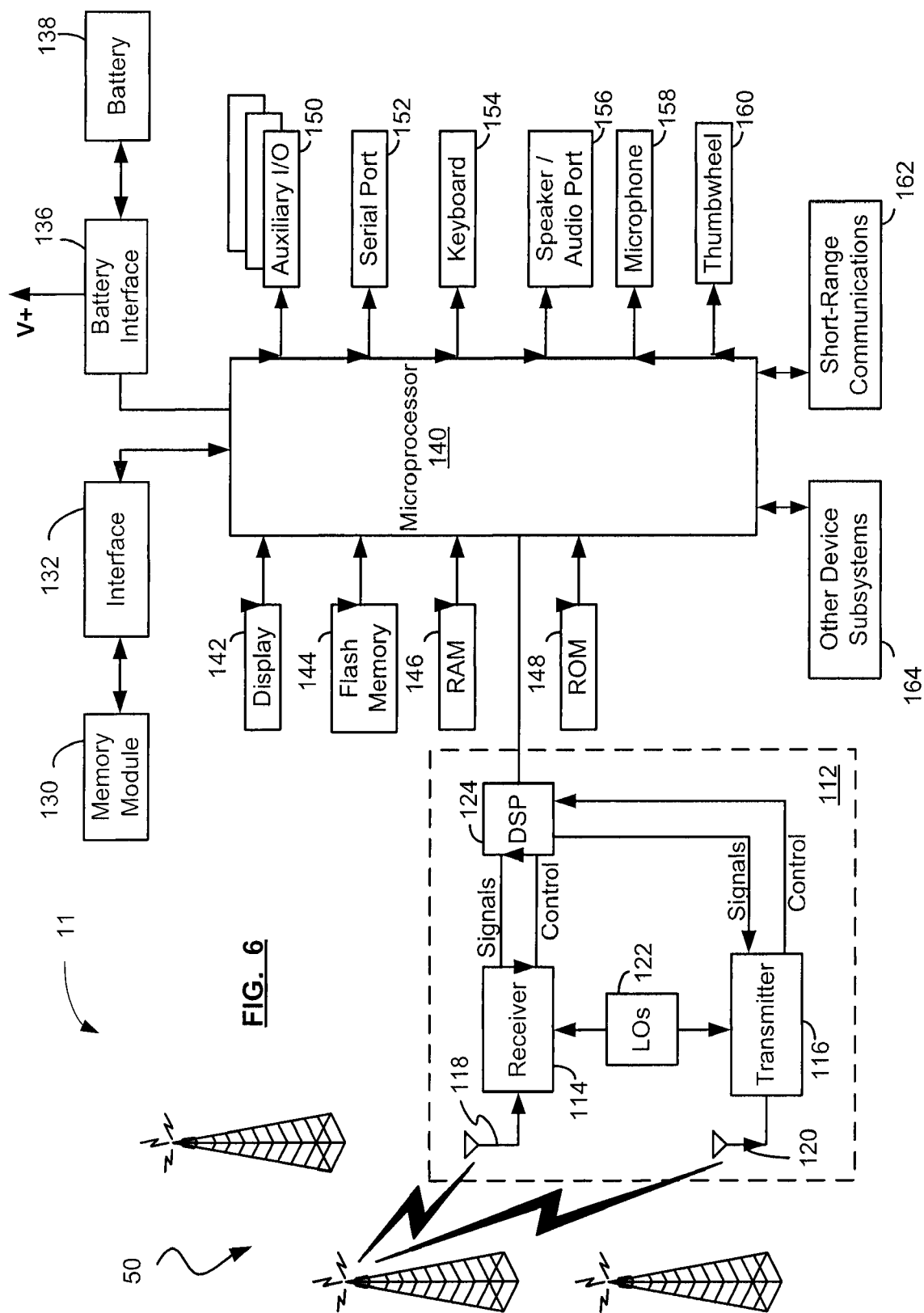
FIG. 6 shows in block diagram form a mobile device suitable for providing intelligent call identification in accordance with an embodiment.

Reference is now made to FIG. 6, which shows a block diagram illustrating a mobile device 11 suitable for use in the system 10 described above in relation to FIG. 1.

In some embodiments mobile device 11 is a two-way mobile communication device having at least voice and data communication capabilities, including the capability to communicate with other computer systems. Depending on the functionality provided by the mobile device 11, it may be referred to as, for example, a data messaging device, a two-way pager, a cellular telephone with data messaging capabilities, a wireless Internet appliance, a data communication device (with or without telephony capabilities), a clamshell device, or a flip-phone. A mobile device 11 may communicate with any one or more of a plurality of fixed transceiver stations within its geographic coverage area.

A mobile device 11 may incorporate a communication subsystem 112, which can include a receiver 114, a transmitter 116, and associated components, such as one or more antenna elements 118 and 120, local oscillators (LOs) 122, and a processing module such as a digital signal processor (DSP) 124. In various embodiments, the antenna elements 118 and 120 may be embedded or internal to the mobile device 11. As will be apparent to those skilled in the relevant arts, the particular design of the communication subsystem 112 depends on the system(s), such as enterprise network 20, the PLMN 50 and/or the WLANs 32, with which the mobile device 11 is intended to communicate.

A mobile device 11 may send and receive communication signals to and from an enterprise server 20 through, for example, the PLMN 50 and/or one of the WLANs 32. Signals received by the antenna 118 are input to the receiver 114, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 124. Signals to be transmitted may be processed, including modulation and encoding, for example, by the DSP 124. DSP-processed signals may be input to the transmitter 116 for digital-to-analog (D/A) conversion, frequency up conversion, filtering, amplification, and transmission via the antenna 120. The DSP 124 not only processes communication signals, but can also provide for receiver and transmitter control. For example, gains applied to communication signals in the receiver 114 and the transmitter 116 may be adaptively controlled through automatic gain control algorithms implemented in the DSP 124.

Network access may be associated with a subscriber or user of the mobile device 11 via a memory module, such as a memory module 130, which may be a Subscriber Identity Module (SIM) card for use in a GSM network or a Universal Subscriber Identity Module (USIM) card for use in a Universal Mobile Telecommunication System (UMTS). The SIM card may be inserted in or connected to an interface 132 of the mobile device 11. Alternatively, the mobile device 11 may have an integrated identity module for use with systems such as Code Division Multiple Access (CDMA) systems.

The mobile device 11 can also include a battery interface 136 for receiving one or more rechargeable batteries 138. Battery(ies) 138 provide electrical power to at least some of the electrical circuitry in the mobile device 11, and the battery interface 136 provides a mechanical and electrical connection for the battery 138. The battery interface 136 is coupled to a regulator (not shown) which provides power V+ to the circuitry of the mobile device 11.

The mobile device 11 can include a microprocessor 140 which controls the overall operation of the mobile device 11. Communication functions, including at least data and voice communications, are performed through the communication subsystem 112. The microprocessor 140 also interacts with additional device subsystems such as one or more display(s) 142, flash memory(ies) 144, random access memory(ies) (RAM(s)) 146, read-only memory(ies) (ROM(s)) 148, auxiliary input/output (I/O) subsystems 150, data port such(s) as Universal Serial Bus (USB) port(s) 152, keyboard(s) or keypad(s) 154, speaker(s) or audio port(s) 156 for connecting to, for example, a set of headphones or an earpiece, microphone(s) 158, clickable thumbwheel(s) or thumbwheel(s) 160, open/close sensor(s) 161, short-range communications subsystem(s) 162, and any other device subsystems generally designated as 164. Some of the subsystems shown in FIG. 6 perform communication-related functions, whereas other subsystems may provide "resident" or on-device functions. Notably, some subsystems, such as the keypad 154, the display 142, and the clickable thumbwheel 160, for example, may be used for both communication-related functions, such as displaying notifications or entering a text message for transmission through, for example, the PLMN 50 and/or one of the WLANs 32, and executing device-resident functions such as a clock, a calculator or a task list. Operating system software used by the microprocessor 140 is preferably stored in a persistent store such as the flash memory 144, which may alternatively be the ROM 148 or similar storage element. Those skilled in the art will appreciate that the operating system, specific device applications, or parts thereof, may be temporarily loaded into a volatile store such as the RAM 146.

The microprocessor 140, in addition to its operating system functions, enables execution of software applications on the mobile device 11. A predetermined set of applications that control basic device operations, including data and voice communication applications, will normally be installed on the mobile device 11 during or after manufacture. The mobile device 11 may include a personal information manager (PIM) application having the ability to organize and manage data items relating to a user such as, but not limited to, instant messaging, email, calendar events, voice mails, appointments, and task items. One or more memory stores may be available on the mobile device 11 to facilitate storage of information, such as the flash memory 144, the RAM 146, the ROM 148, the memory module 130, or other types of memory storage devices or FLASH memory cards represented by the other device subsystems 164, such as Secure Digital (SD) cards or mini SD cards, etc.

The PIM and/or media applications have the ability to send and receive data items via the PLMN 50 and/or one of the WLANs 32 or via a link to a computer system. The link to the computer system may be via the serial port 152 or the short-range communications subsystem 162. In an embodiment, PIM and/or media data items are seamlessly combined, synchronized, and updated, for example, through the PLMN 50 and/or one of the WLANs 32, with the mobile device user's corresponding data items stored and/or associated with a host computer system thereby creating a mirrored or partially mirrored host computer on the mobile device 11 with respect to such items. This may be advantageous where the host computer system is the mobile device user's office computer system. Additional applications may also be loaded onto the mobile device 11 through, for example, the PLMN 50 and/or one of the WLANs 32, the auxiliary I/O subsystem 150, the serial port 152, the short-range communications subsystem 162, or any other suitable subsystem 164, and installed by a user in the RAM 146 or a non-volatile store such as the ROM 148 for execution by the microprocessor 140. Such flexibility in application installation increases the functionality of the mobile device 11 and may provide enhanced on-device functions, communication-related functions, or both. For example, secure communication applications may enable electronic commerce functions and other such financial transactions to be performed using the mobile device 11.

In a data communication mode, a received data signal representing information such as a text message, an email message, a media file to be transferred, or Web page download can be processed by the communication subsystem 112 and input to the microprocessor 140. The microprocessor 140 can further process the signal for output to the display 142 or alternatively to the auxiliary I/O device 150. A user of the mobile device 11 may also compose data items, such as email messages, for example, using the keypad 154 and/or the clickable thumbwheel 160 in conjunction with the display 142 and possibly the auxiliary I/O device 150. The keypad 154 maybe either a complete alphanumeric keypad or telephone-type keypad. These composed items may be transmitted through the communication subsystem 112 or via the short range communication subsystem 162.

For voice communications, the overall operation of the mobile device 11 is similar, except that the received signals would be output to the speaker or audio port 156 and signals for transmission would be generated by a transducer such as the microphone 158. Alternative voice or audio I/O subsystems, such as a voice message recording subsystem, may also be implemented on the mobile device 11. Although voice or audio signal output is typically accomplished primarily through the speaker or audio port 156 or the display 142 may also be used to provide an indication of the identity of a calling party or the communication type, duration of a voice call, or other voice call related information. Stereo headphones or an earpiece may also be used in place of the speaker 156.

The USB port 152 is normally implemented in a personal digital assistant (PDA) type communication device for which synchronization with a user's computer is a desirable, albeit optional, component. The USB port 152 enables a user to set preferences through an external device or software application and extends the capabilities of the mobile device 11 by providing for information or software downloads to the mobile device 11 other than through the PLMN 50 and/or one of the WLANs 32. The alternate download path may, for example, be used to load software or data files onto the mobile device 11 through a direct, reliable and trusted connection.

The short-range communications subsystem 162 is an additional optional component which provides for communication between the mobile device 11 and different systems or devices, which need not necessarily be similar devices. For example, the subsystem 162 may include an infrared device and associated circuits and components, or a wireless bus protocol compliant communication mechanism such as a Bluetooth™ communication module to provide for communication with similarly-enabled systems and devices (Bluetooth™ is a registered trademark of Bluetooth SIG, Inc.). In another embodiment, the short-range communications subsystem 162 may be a wireless networking communications subsystem, conforming to IEEE 802.11 standards such as one or more of 802.11b, 802.11g, and/or 802.11n.

Figure 7:
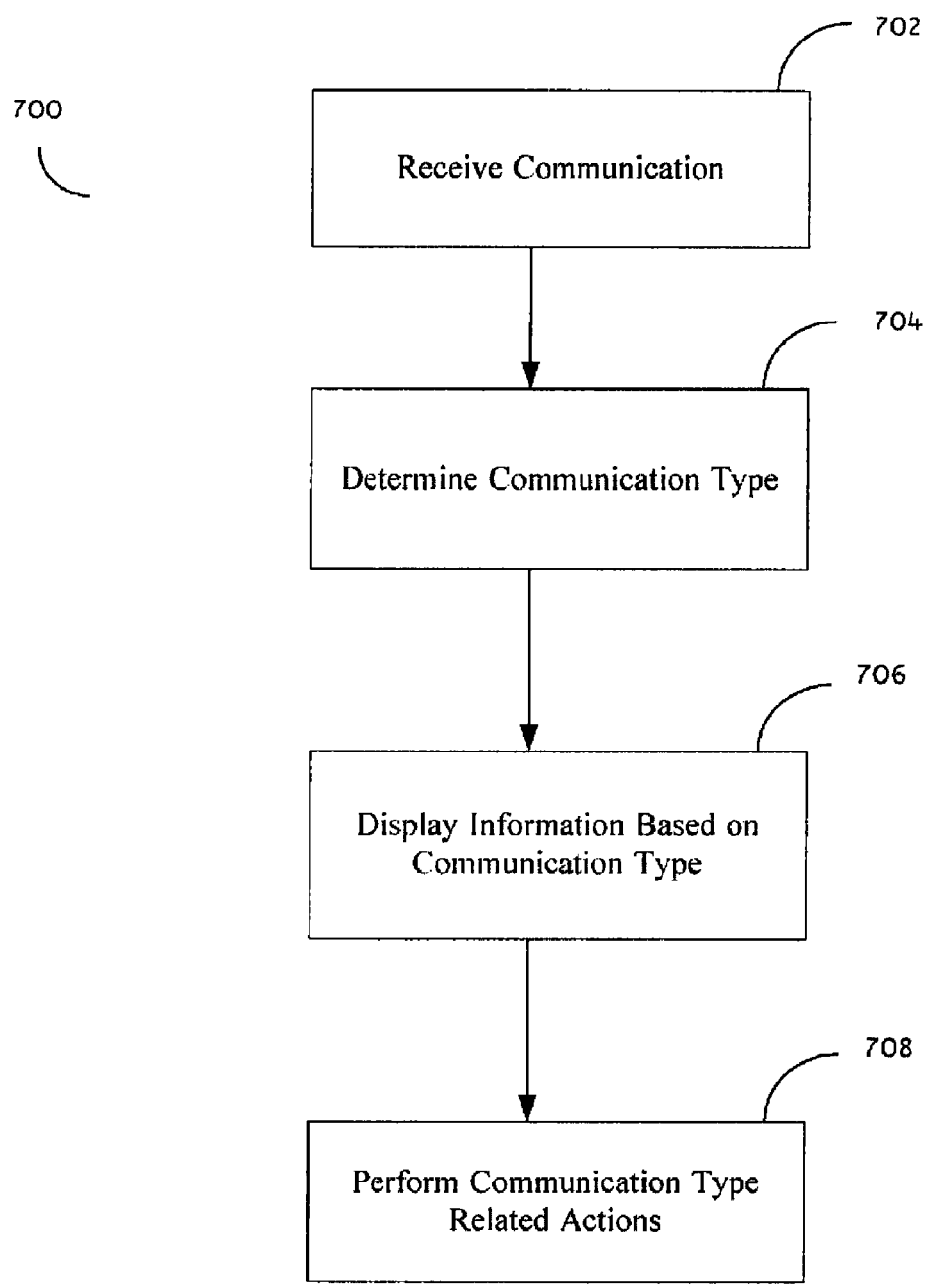
FIG. 7 shows a method of displaying a communication type of an incoming communication on a mobile device according to an embodiment.

Reference is next made to FIG. 7, which shows an embodiment of a method 700 of displaying information relating to a communication type of an incoming communication according to one embodiment. The method 700 is suitable for use in, for example, the mobile device 11 such as that shown in FIG. 6 to which reference will be made where appropriate. Method 700 can start at block 702 where a communication is received by the communication subsystem 112 of the mobile device 11.

At 704, the communication type of the incoming communication may be determined by the mobile device 11. This may be done, for example, using a communication identifying module resident in a memory of the mobile device 11, such as RAM 146, ROM 148, or flash memory 144, to be executed by a processor, such as microprocessor 140. Each incoming communication can be assigned a communication type. The communication type could, for example, be a feature-based communication type, such as a conference call or a voice notification, and/or it may be a priority-based type, such as a high priority, low priority, regular priority or emergency communication. While in the examples that follow each communication will be described as being assigned a single communication type, it will be understood by those in the art that a single communication may be assigned or otherwise associated with multiple communication types. For example, a communication could be a high-priority conference call. Communications which have no other designation may be assigned a default communication type such as regular priority.

The communication type of an incoming communication may be assigned by any server or other processor processing data related to the call, including, for example, an enterprise network 20 originating or receiving the communication. Information relating to the communication type of an incoming communication can be associated with other information associated with the communication, including, for example, data useful in establishing a communications session, and sent to the mobile device 11 from the enterprise network 20 when the communication is relayed using, for example, either a voice or data channel. As another option, the mobile device 11 may interpret the communication and associated information and assign a communication type based on, for example, the identity of the caller or other information available to it.

Where the communication type is a feature-based communication type, such as, for example, a conference call or a voice notification, the communication type may be inherent in the communication. A feature-based communication type relates to a feature of the communication, such as the content or intended form of a communication, not to the priority of the communication. Where the communication type is a priority-based communication type, such as, for example, a high priority, a low priority, a regular priority or an emergency communication, the communication type may be established based on one or more rules. Data representing these rules and useful in their interpretation by the processor(s) by which they are to be applied may reside in the enterprise network 20. In this case, information regarding the priority of the communication may be sent to the mobile device 11 as explained above, or may reside in a memory of the mobile device 11, such as ROM 148, RAM 146 or flash memory 144 of the mobile device of FIG. 6. The rules for designating the priority of a communication may be set by, for example, an information technology policy that is setup by an administrator or may be a personal policy set up by the user of the mobile device 11.

The rules may, for example, be specific to the identity of the origin of the communication. For example, all communications from a specific individual, such as the user's boss or the user's spouse, may be considered to be high priority communications. The rules may also relate to, for example, the time of day or the location of the mobile device.

In some embodiments, the communication type of an incoming communication may be assigned by the source of the communication either directly or, for example, by contacting a switchboard to have the communication type modified (e.g. increasing the priority of the communication).

Figure 9A:
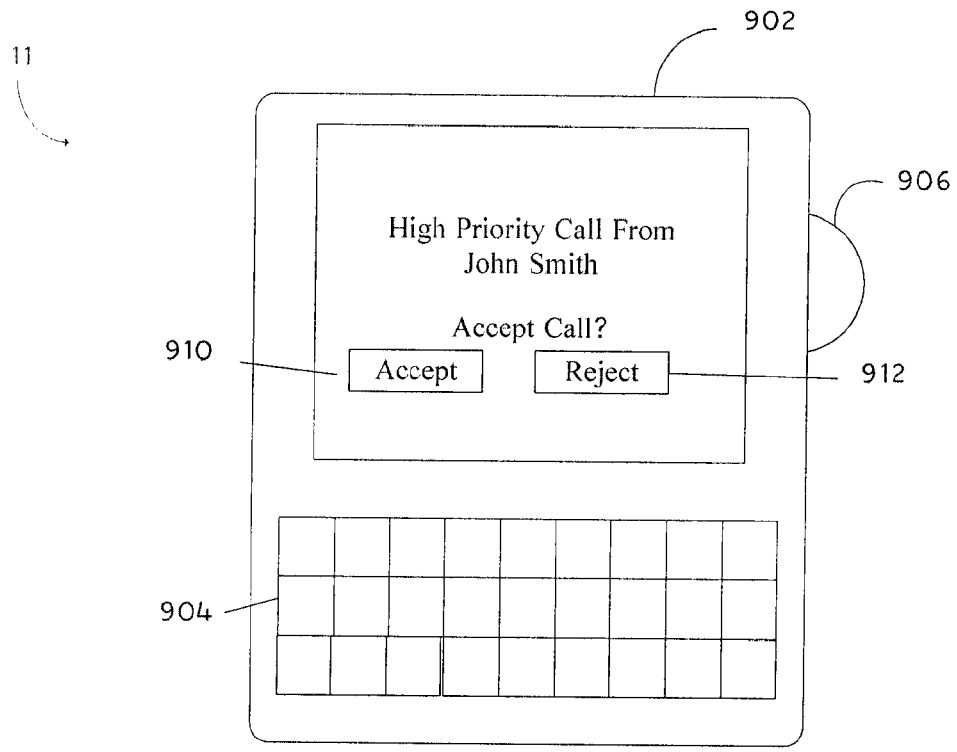
FIG. 9A shows a front view illustrating an embodiment of the mobile device of FIG. 6 displaying a notification of a high priority communication.
Figure 9B:
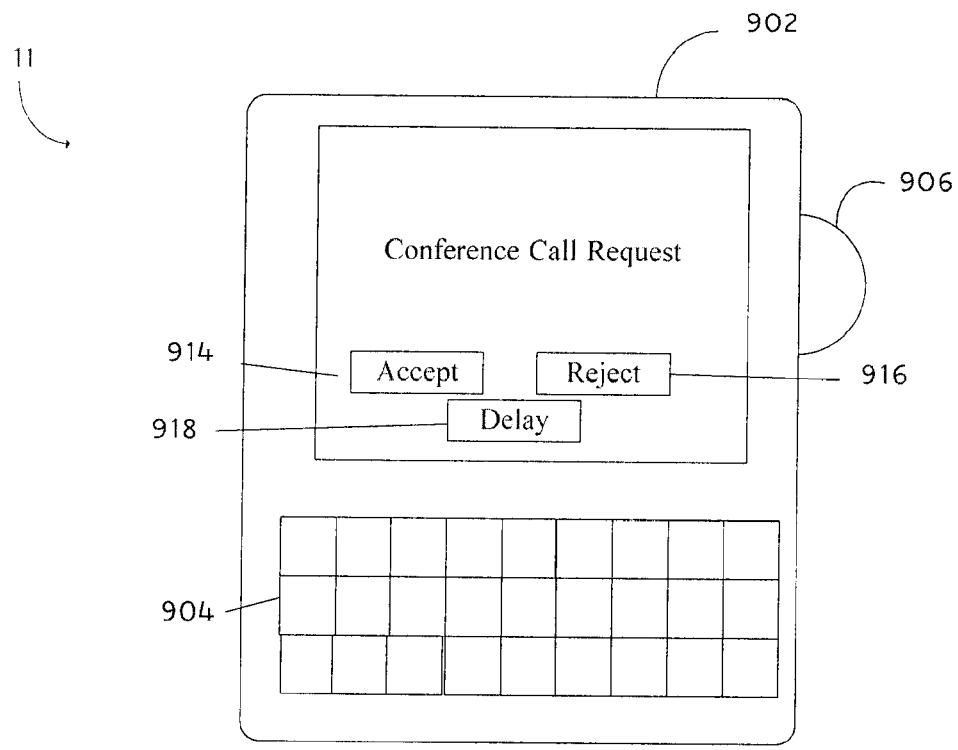
FIG. 9B shows a front view illustrating an embodiment of the mobile device of FIG. 6 displaying a notification of a conference communication.

At 706, information relating to the communication type of the incoming communication is displayed on the mobile device 11, for example on a display 142 of the mobile device 11 of FIG. 6. This may be done, for example, using a display module resident in a memory of the mobile device 11, such as RAM 146, ROM 148, or flash memory 144, to be executed by a processor, such as microprocessor 140. The displayed information may include, for example, a message identifying the communication type and possibly other relevant information such as the origin of the communication. One or more options may also be presented to the user based on the communication type. For example, as shown in FIG. 9A, if the incoming communication is a high priority call, the options presented to the user may include an option to answer the call and an option to disregard the call. As shown in FIG. 9B, if the incoming communication is intended to comprise a request to join a conference call, the options presented to the user may include a option to accept the request, reject the request or delay joining the call for a period of time. The information displayed, including the options presented, may also vary depending on other factors such as whether there is currently another communication in progress on the mobile device and the communication type of this other communication.

At block 708, the mobile device 11 may optionally perform one or more actions based in the communication type of the incoming communication. This may be done, for example, using an action module resident in a memory of the mobile device 11, such as RAM 146, ROM 148, or flash memory 144, to be executed by a processor, such as microprocessor 140. For example, if the incoming communication is an emergency communication, the mobile device may parse and interpret data associated with the communication request and apply previously-stored rules causing the device to interrupt another communication currently in progress on the mobile device 11. As another example, the mobile device may emit certain type of notification, such as an auditory or visual notification, depending on the communication type of the incoming communication. A visual notification, for example, could include a flashing light, such as an LED light, on the mobile device 11. The notification may also include movement such as causing the mobile device 11 to vibrate.

Figure 8:
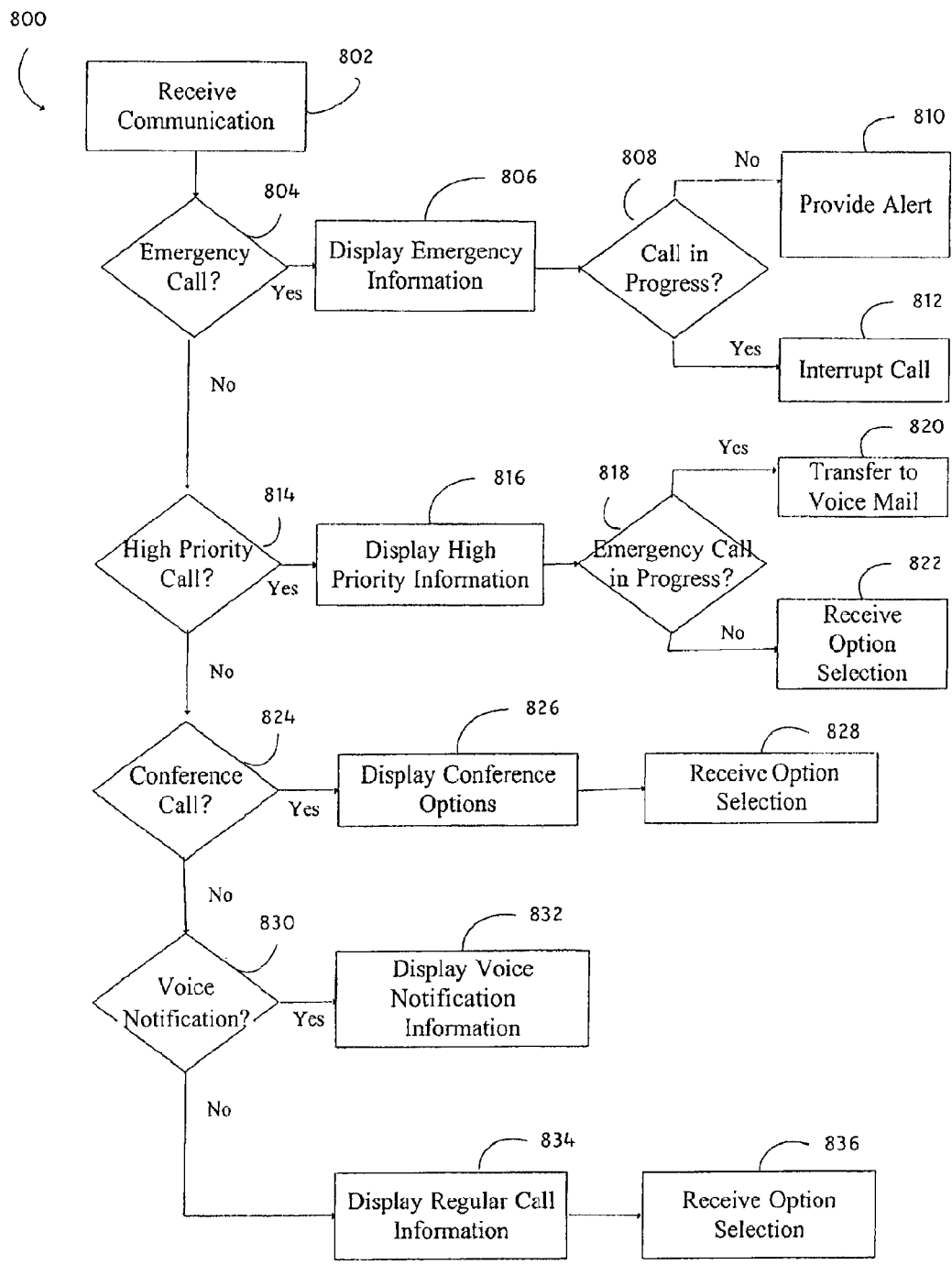
FIG. 8 shows a method of handling specific communication types on a mobile device according to an embodiment.

Reference is now made to FIG. 8, which shows an embodiment of a method 800 of processing based on the communication type of an incoming communication according to one embodiment. Reference will be made to FIG. 6 where appropriate.

Method 800 can start at block 802 where a communication is received by the communication subsystem 112 of the mobile device 11.

At 804, it is determined whether the incoming communication is an emergency communication. If the incoming communication is associated with data indicating an emergency communication, at 806, microprocessor 140 can cause a suitable wholly- or partially-predetermined message intended to indicate that the communication is an emergency communication to be displayed on a display 142 of the mobile device 11. At block 808, processor 140 can poll other components, such as a register containing information about current or pending processes being handled by the device 11, to determine whether there is currently another communication in progress on the mobile device 11. If there is another communication in progress then the communication in progress may be interrupted, either with or without an option of approval by a user of the device 11 (as for example through a guided instruction screen such as that shown in FIG. 9A suitably modified, if desired), and the emergency communication may connected at block 812 in preference of other pending processes. If there is no communication currently in progress on the mobile device then an emergency alert may be provided at block 810. The emergency alert may, for example, be the regular notification used by the mobile device emitted at a louder volume and/or it may be a notification specifically designated and/or reserved for emergency situations. The alert may also include, for example, emitting one or more lights and/or causing the mobile device 11 to move (e.g. vibrate).

If the incoming communication is determined, on the basis of information represented by data provided with the communication request, not to be an emergency communication, at block 814, it can be determined whether the communication is a high priority communication. If the incoming communication is a high priority communication then the high priority information is displayed at block 816. At block 818, it is determined whether there is currently another communication in progress on the mobile device 11. If there is another communication in progress and that communication is an emergency communication then the incoming communication is transferred directly to the voice mail of the user of the mobile device 11 at block 820. Otherwise, the mobile device 11 will wait at block 822 to receive an indication from the user as to whether the user chooses to respond to the communication at the present time and responds accordingly.

If the incoming communication is determined not to be a high priority communication, at block 824, it can be determined whether the communication is a conference call request. If the incoming communication is identified by the data associated with the communication request as a conference call request then suitably-adapted conference call request options, such as those shown in FIG. 9B, may be displayed at block 826. At block 828, the mobile device waits to receive an indication of the option chosen by the user of the mobile device and responds accordingly.

If the incoming communication is not a conference call request, at block 830, it may be determined whether the communication is a voice notification. If the incoming communication is determined to be a voice notification then information relating to the request may be displayed at block 832.

If the incoming communication is not a voice notification, it can be assumed that the communication is a regular priority communication. The regular priority information is displayed at block 834. The mobile device 11 will wait at block 836 to receive an indication from the user as to whether or not the user chooses to respond to the communication at the present time and responds accordingly.

The method 800 represents an example processing of various types of communication types which could be identified and an example of how the mobile device could handle these communication types. Those skilled in the art will recognize that there may be many different possible communication types which could be identified. Similarly, those skilled in the art will recognize that there can be different information displayed in relation to the type of the communication and different responses to the type of the communication.

While the embodiments of methods 700 and 800 comprise blocks or steps shown as occurring in a particular order, it will be appreciated by those skilled in the art that many of the blocks are interchangeable and may occur in different orders that that shown without materially affecting the end results of the methods 700 and 800.

Reference is next made to FIG. 9A which shows a front view of an embodiment of a mobile device 11 displaying a call identification notification. The mobile device 11 includes a display 902, a keyboard 904 and a thumbwheel 906.

The display 902 shows a notification of an incoming high priority call according to one embodiment. The notification includes the priority of the communication and the name of the calling party as well as two options 910 and 912. The first option 910 allows the user to answer the call. The second option 912 allows the user to dismiss the notification without answering the call. An option can be selected by the user using the keyboard 904, the thumbwheel 906 or a combination thereof.

Reference is next made to FIG. 9B which shows a second front view of an embodiment of a mobile device 11 displaying a call identification notification. In this example, the display 902 shows a notification of an incoming conference call request according to one embodiment. The notification includes three options 914, 916 and 918. The first option 914 allows the user to accept the conference call. The second option 916 allows the user to reject the conference call request. The third option 918 allows the user to delay joining the conference for a set period of time. An option can be selected using, for example, known types of interactive options selection and known means of entering commands, such as the use of pointing devices, including for example scroll wheels and trackballs and keystrokes or combinations thereof. In this example, an option can be selected using the keyboard 904, the thumbwheel 906 or a combination thereof.

While the present disclosure is primarily described as a method, a person of ordinary skill in the art will understand that the present disclosure is also directed to an apparatus for carrying out the disclosed method and including apparatus parts for performing each described method block, be it by way of hardware components, a computer programmed by appropriate software to enable the practice of the disclosed method, by any combination of the two, or in any other manner suitable for accomplishing the purposes disclosed herein. As a specific example, one or more microprocessor(s) 140 provided on device 11, executing hard-wired or software encoded stored programming products comprising modules configured for parsing incoming data strings to identify communication types and to display suitably-adapted messages on one or more displays 142. For example, processes 700, 800 can be controlled or otherwise executed by processor(s) 140 executing programmed command structures stored in memory(ies) 130. Such stored command structures can comprise suitably-adapted program modules (or dedicated circuits) for accomplishing the interpretations and decision-making processes disclosed above.

Such modules can include, for example, a communication identifying module resident in the memory 130 for execution by the processor 140 configured to determine a communication type for an incoming communication, received by the communication subsystem, based on the associated information; and a display module for displaying information relating to the communication type on the at least one display.

Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the disclosed method. It is understood that such apparatus, articles of manufacture, and computer data signals also come within the scope of the present disclosure.

Certain adaptations and modifications of the described embodiments can be made. Therefore, the above discussed embodiments are considered to be illustrative and not restrictive.

What is claimed is:

1. A mobile device adapted for communication with an enterprise telecommunications network, the mobile device comprising:
   a processor for controlling operations of the mobile device and communications between the mobile device and other devices;
   a memory coupled to the processor;
   a communication subsystem adapted for receiving communications and associated information from the enterprise telecommunications network;
   at least one display for displaying information on the mobile device;
   a communication identifying module resident in the memory for execution by the processor, the communication identifying module being configured to cause the processor to determine a communication type for an incoming communication received by the communication subsystem, based on the associated information, the communication type being determined based on whether the incoming communication is:
a feature-based communication corresponding to a feature-based communication type, a priority-based communication corresponding to a priority-based communication type, or a feature-and-priority-based communication corresponding to a feature-and-priority-based communication type;
a display module for displaying information relating to the communication type on the at least one display; and
an action module for performing at least one communication-related action related to the communication type;
wherein the at least one communication-related action includes interrupting an active communication with notification or acceptance of a new incoming priority-based communication even when the new incoming communication does not have a higher priority than the active communication.

2. The mobile device of claim 1, wherein the communication type is determined by the enterprise telecommunications network and the associated information comprises the communication type.

3. The mobile device of claim 1, wherein the associated information comprises information regarding the source of the incoming communication.

4. The mobile device of claim 1, wherein the feature-based communication type comprises: a conference call and a voice notification.

5. The mobile device of claim 1, wherein the priority-based communication type comprises: an emergency communication, a high priority communication, a regular priority communication and a low priority communication.

6. The mobile device of claim 1, wherein the mobile device further comprises one or more input devices for receiving input from a user of the mobile device, the display module is further configured to display one or more options for performing one of the at least one communication-related action on the at least one display and the action module performs one of the at least one communication-related action based on an option selected by the user from the one or more options using the one or more input devices.

7. The mobile device of claim 1, wherein the at least one communication-related action comprises emitting a notification based on the communication type to alert a user to the incoming communication.

8. The device of claim 1, wherein a priority of a priority-based communication is determined by the mobile device or the enterprise telecommunications network according to at least one predetermined rule.

9. The device of claim 8, wherein the at least one predetermined rule defines the priority of the priority-based communication according to at least one of: an origin of the communication, a time of day, and a current location of the mobile device.

10. The device of claim 1, wherein the incoming communication is both a feature-based communication and a priority-based communication, wherein the incoming communication is the feature-and-priority-based communication and determining the communication type comprises determining the feature-and-priority-based communication type.

11. A method of displaying information regarding an incoming communication on a mobile communications device, the method executed by at least one processor on the mobile communications device, the mobile communications device comprising a communication subsystem and at least one display, the method comprising:
receiving, from the communication subsystem, data representing signals representing information about an incoming communication;
causing execution of a communication identifying module resident in a memory associated with the processor to determine a communication type for the incoming communication, the communication type being determined based on whether the incoming communication is a feature-based communication corresponding to a feature-based communication type, a priority-based communication corresponding to a priority-based communication type, or a feature-and-priority-based communication corresponding to a feature-and-priority-based communication type;
causing the at least one display to display information relating to the communication type; and
performing at least one communication-related action related to the communication type;
wherein the at least one communication-related action includes interrupting an active communication with notification or acceptance of a new incoming priority-based communication even when the new incoming communication does not have a higher priority than the active communication.

12. The method of claim 11, wherein the information about the incoming communication comprises the communication type.

13. The method of claim 11, wherein the information about the incoming communication comprises information regarding the source of the incoming communication.

14. The method of claim 11, wherein the feature-based communication type comprises: a conference call and a voice notification.

15. The method of claim 11, wherein the priority-based communication type comprises: an emergency communication, a high priority communication and a low priority communication.

16. The method of claim 11, wherein displaying information relating to the communication type comprises providing one or more options for performing one of the at least one communication-related action to the user and one of the communication-related action is performed based on an option selected by the user from the one or more options.

17. The method of claim 11, the method further comprising emitting a notification wherein the type of notification is based on the communication type.

18. The method of claim 11, wherein the communication type is determined based on associated information provided by an enterprise telecommunications network.

19. The method of claim 11, wherein a priority of the new incoming priority-based communication is determined according to at least one predetermined rule.

20. The method of claim 19, wherein the at least one predetermined rule defines the priority of the priority-based communication according to at least one of: an origin of the communication, a time of day, and a current location of the mobile communications device.

21. The method of claim 11, wherein the incoming communication is both a feature-based communication and a priority-based communication, wherein the incoming communication is the feature-and-priority-based communication and determining the communication type comprises determining the feature-and-priority-based communication type.

* * * * *